United States Patent [19]

Nakaso et al.

[11] 4,091,526
[45] May 30, 1978

[54] MACHINE TOOL WITH AN AUTOMATIC TOOL EXCHANGER

[75] Inventors: Tohru Nakaso, Nagoya; Manabu Hosokawa, Chiryu; Kenzi Nomura, Aichi; Tatsuya Hikosaka, Toyohashi, all of Japan

[73] Assignee: Toyoda Machine Works, Ltd., Japan

[21] Appl. No.: 755,574

[22] Filed: Dec. 29, 1976

[30] Foreign Application Priority Data

Jan. 29, 1976 Japan .................................. 51-9029

[51] Int. Cl.² ............................................. B23Q 3/157
[52] U.S. Cl. .................................... 29/568; 74/813 L
[58] Field of Search ........................ 29/568; 90/11 A; 74/813 L, 817, 822

[56] References Cited
U.S. PATENT DOCUMENTS 3,994,061  11/1976  Tomita et al. ......................... 29/568

*Primary Examiner*—Z. R. Bilinsky
*Attorney, Agent, or Firm*—Oblon, Fisher, Spivak, McClelland & Maier

[57] ABSTRACT

A machine tool is provided with an exchange arm for automatically exchanging tools between a tool spindle and a tool magazine. A drive key and a detent pin protrude respectively from the tool spindle and each of the tool storage portions of the magazine and are engageable, with a predetermined play, with a key-way of each tool. A fine indexing device has a rotatable cam drum on which a first cam segment is formed for indexing the tool spindle to a predetermined angular position following a coarse indexing operation by a coarse indexing device. A second cam segment is further formed on the cam drum to rotate the tool spindle more than the play from said predetermined angular position after a fresh tool is inserted into the spindle, so that a positive engagement between the drive key and the key-way of the tool can be achieved.

11 Claims, 10 Drawing Figures

MACHINE TOOL WITH AN AUTOMATIC TOOL EXCHANGER

BACKGROUND OF THE INVENTION

1. Field of the Invention

The present invention relates generally to machine tools and, more particlarly, to a machine tool with an automatic tool exchanger for exchanging a tool received in a tool spindle with another tool selected out of a tool magazine.

2. Description of the Prior Art

In a known machine tool of this kind, a drive key and a key-way complemental thereto are provided respectively on a tool spindle and each of the tools to transmit the driving force of the tool spindle to the tool received therein, and the tool spindle is arranged to be indexed to a predetermined angular position prior to a tool exchange operation. At tool holding portions of a tool magazine, there are provided detent members with which the key-ways of the tools are respectively snugly engaged, so as to prevent the tools from angularly moving even a little in the stored state. Furthrmore, the drive key and the key-way are machined to almost the same width, such as, for example, the former being 25.4 mm. wide, the latter being 25.7 mm. wide, and thus, when engaged, to establish little clearance or play therebetween so as not to permit relative rotation between the tool spindle and the tool received by the same.

In the prior art machine tool, therefore, when the tool is presented onto the tool spindle, with its key-way not being exactly aligned with the drive key, the performance of an automatic tool exchange operation becomes impossible since, in such an event, the drive key necessarily interferes with a flange portion of the tool. This trouble occurs, though rarely, due to the fact that there appear many technical difficulties in exactly holding all of the tools stored within the tool magazine at the same angular position and also in presenting the tool to the tool spindle with its key-way being exactly aligned with the drive key.

SUMMARY OF THE INVENTION

Accordingly, it is a primary object of the present invention to provide a machine tool with a tool exchanger having high reliability in operation.

Another object of the present invention is to provide a machine tool with an improved tool exchanger in which a drive key of a tool spindle and a key-way of each tool are determined to facilitate a tool insertion into the tool spindle, as well as into a tool magazine, and nevertheless the drive key positively drives the tool when the tool spindle is rotated.

A further object of the invention is to provide a machine tool with an improved tool changer, as above, which uses a peculiar cam mechanism for indexing a tool spindle to a predetermined angular position and for effecting a positive contact between a drive key and a key-way of each tool.

Briefly, the foregoing and other objects are achieved, according to the present invention, through the provision of an improved machine tool which comprises a rotatable tool spindle for receiving a tool, a tool magazine for removably storing a plurality of tools, an exchange arm for exchanging tools between the tool spindle and the tool magazine, a coarse indexing device for stopping the tool spindle within a predetermined angular extent after a machining operation, and a fine indexing device composed of a movable cam member provided with a cam segment for indexing, to a predetermined angular position, the tool spindle having been indexed within the angular extent.

The tool spindle is provided at one end thereof with a drive key, with which a key-way, formed upon each tool, is engageable with a predetermined play. At tool storage portions of the magazine, there are respectively provided a plurality of detents in the same angular relationship with one another, each of which has almost the same width as that of the drive key.

The movable cam member is further provided with another cam segment for rotating the tool spindle a little from the predetermined angular position after a fresh tool is inserted by the exchange arm into the tool spindle. Accordingly, a relative rotation is made between the tool spindle and the inserted fresh tool, so that the drive key can be brought into a positive drive relation with the key-way of the fresh tool.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference numerals designate like or corresponding parts throughout the several views, and wherein.

DETAILED DESCRIPTION OF THE PREFERRED EMBODIMENTS

Figure 1:
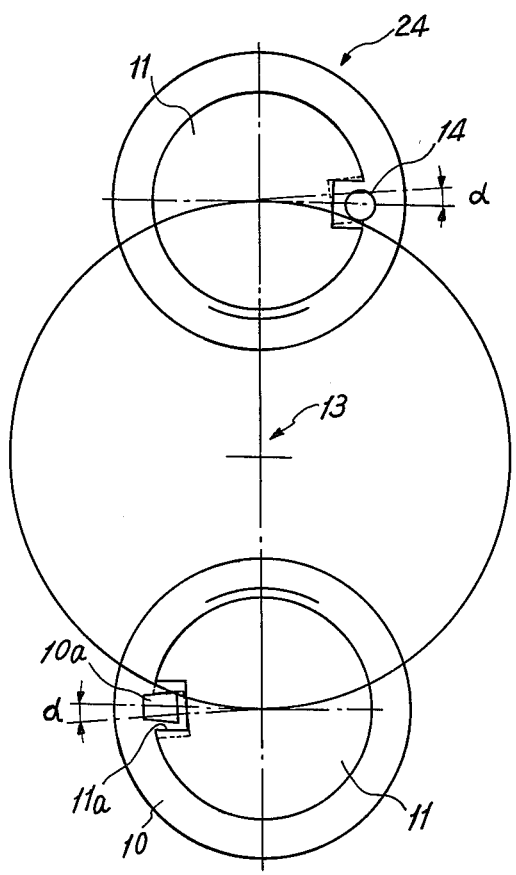
FIG. 1 is a schematic diagram illustrative of the basic tool exchange operation of the present invention.

Referring now to the drawings and more particularly to FIG. 1 thereof, illustrative of the basic tool exchange operation of the invention, there is provided a tool spindle 10, from one end of which a drive key 10a protrudes to be engageable, with play, with a key-way 11a cut out on a flange of a tool or a tool holder 11. In the state indicated by the solid line, clearances, each corresponding to an angle $a$, are established between the drive key 10a and both side walls of the key-way 11a, and the tool spindle 10 and the tool 11 are thus relatively rotatable within an angular extent 2d.

Generally, the tool or the tool holder 11 which is extensively used in this field has a tapered shank of National Taper (N.T.) No. 50, and the key-way 11a of the tool 11 is machined to be 25.7 mm wide. In the present invention, the width of the drive key 10a is made narrower, within the range of 5 to 70%, than that of the key-way 11a. In this instance, the clearance between the drive key 10a and the key-way 11a increases by an angle of 0.9° each time the width of the drive key 10a is reduced 1mm. However, it should be noted that if the width of the drive key 10a is made narrower, within a range less than 5% of that of the key-way 11a, the advantage resulting from such is scarcely obtained, and that if the width of the drive key 10a is made narrower, by more than 70% relative to that of the key-way 11a, a problem may occur within the strength of the drive key 10a.

the tool 11 stored in a tool holding portion, which is in a tool removal station of a tool magazine 24, is removed therefrom and presented onto the tool spindle 10 by a tool exchange arm 13 which operates, in order, through an extension movement, a rotational movement of an angle of 180°, and a withdrawal movement. A detent pin 14 protrudes at the tool holding portion of the tool magazine 24 and is engaged with the key-way 11a of the tool 11 with a play of an angular extent $2\alpha$, within which the tool 11 is therefore rotatable. Although, in FIG. 1, only one tool holding portion is shown, which has been indexed to the tool removal station, it is apparent that a detent pin 14 is provided at each of the tool holding portions in the same angular relationship with one another, that is, at the three o'-clock position of each tool holding portion, as shown in FIG. 1. As the exchange arm 13 is such that it is rotated through an angle of 180°, the tool spindle 10, prior to a tool transfer operation, is so stopped as to position the drive key 10a at a predetermined angular position corresponding to the detent pin 14 in the tool removal station, namely at the nine o'clock position, as shown in FIG. 1, and in this condition, the tool transfer operation is performed.

Thus, even when the key-way 11a of the tool presented by the tool exchange arm 13 onto the tool spindle 10 is deviated within an angular extent of $\pm\alpha$ from the nine o'clock position, it is possible for the key-way 11a of the tool 11 to be engaged with the drive key 10a, owing to the provision of the clearance $2\alpha$. Accordingly, the problem of the tool exchange operation being interrupted because of the interference between the drive key 10a and the key-way 11a is avoided, whereby reliability in the exchange operation is enhanced. In the machine tool according to this invention, the clearance $\alpha$, which appears between rear surfaces of the drive key 10a and the key-way 11a, is eliminated before a machining operation by rotating the tool spindle 10 and, therefore, there can also be realized a tool drive superior to those of known apparatus with respect to its reliability.

Referring to FIGS. 2 to 7, a preferred embodiment will now be described. A machine tool illustrated in FIG. 2 has a column 20, on which a spindle head 21, rotatably supporting a tool spindle 10, is guided to be slidable in a vertical direction. On a work table 22, which is slidable in longitudinal and transverse directions relative to the column 20, there is indexably mounted a rotary table 23, onto which a workpiece W is attachable. A tool magazine 24 for storing a plurality of diverse tools 11 is indexably mounted on the top of the column 20. Between the tool magazine 24 and the tool spindle 10, there is provided an automatic tool exchanger 15, having an exchange arm 13, which is provided with a pair of grippers 13a, 13b at both ends thereof. Tools 11, 11 stored within the tool magazine 24 and received in the tool spindle 10 are gripped by the grippers 13a, 13b, removed therefrom, mutually replaced through the rotation of an angle of 180°, and inserted thereinto and, in such a manner, a tool exchange operation is carried out.

Figure 3:
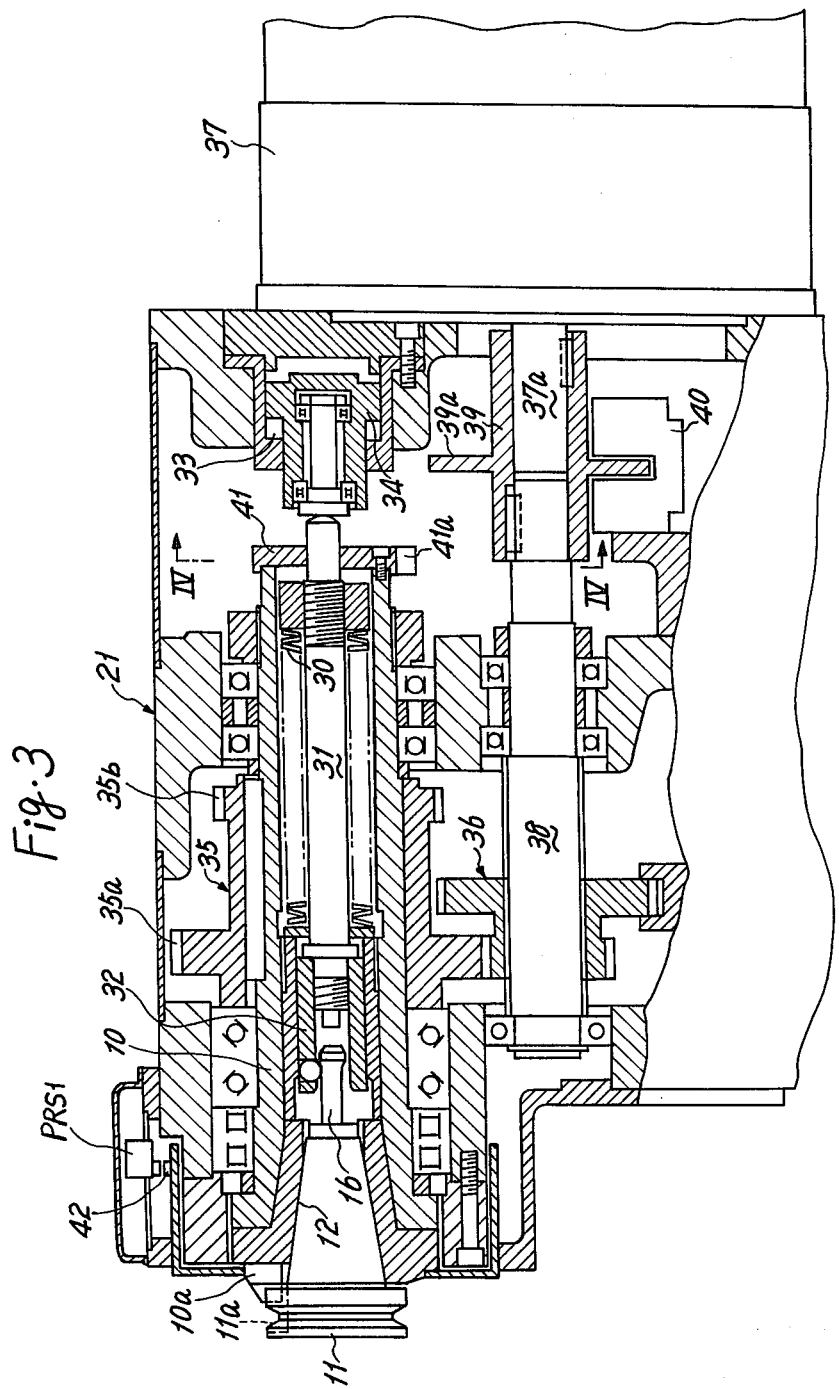
FIG. 3 is a longitudinal sectional view of the apparatus taken along the line III—III of FIG. 2.

As best shown in FIG. 3, the tool spindle 10 is formed at one end thereof with a tapered bore 12 for receiving the tool 11 and is provided with a drive key 10a protruding from the end face. The tool 11, when inserted into the tapered bore 12, is firmly clamped upon the tool spindle 10 as a pull stud 16, protruding from its rear end, is drawn by a snap member 32, connected with one end of a drawing rod 31, which a set of washer springs 30 are always drawing in a rearward direction. In face to face relation with the rear end of the drawing rod 31, there is disposed an unclamping cylinder 33, a piston 34 of which, when advanced, compresses the washer springs 30, so as to advance the drawing rod 31 and to thereby release the pull stud 16 from the snap member 32, so that removal of the tool 11 becomes possible.

A gear member 35 is keyed on the tool spindle 10 substantially intermediate the length of the same. On the gear member 35, there are formed, in spaced relation, a large gear 35a and a small gear 35b, with both of which a shiftable gear member 36 is selectively engageable. The shiftable gear member 36 is held upon and spline-engaged with a spline shaft 38, which is in turn connected with an output shaft 37a of an electrical motor 37. A coupling 39 is provided with a disc 39a, to which a brake unit 40 is disposed to press its brake pads. A dog 42 is secured upon the forward end of the tool spindle 10 at a predetermined angular disposition. When electrical conduction to the motor 37 is stopped after a machining operation, but rotation of the tool spindle 10 still continues because of its inertia, an appropriate switch PRS1 secured upon the spindle head 21 is activated by the dog 42, to energize the brake unit 40, so that the tool spindle 10 can be stopped within a predetermined angular extent (coarse index).

Figure 4:
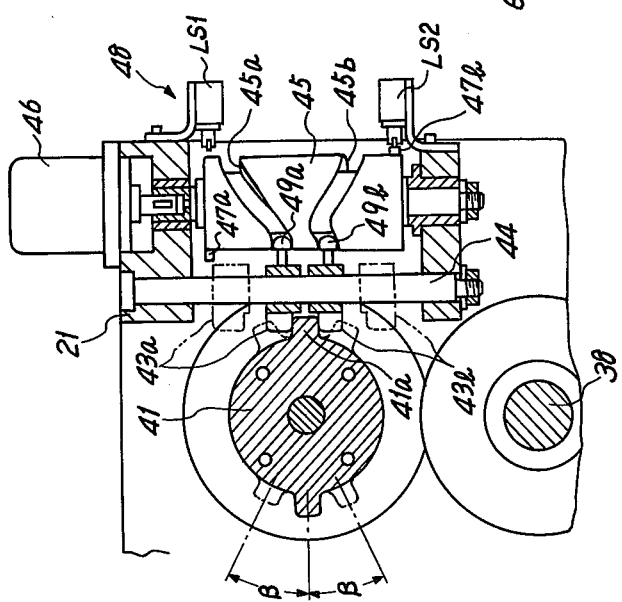
FIG. 4 is a fragmental longitudinal sectional view of the apparatus taken along the line IV—IV of FIG. 3.

At the rear end of the tool spindle 10, there is secured an index plate 41 having a protrusion 41a. After being positioned by the brake unit 40, the dog 42 and the approximate switch PRS1, within such a predetermined angular extent $2\alpha$, as to be engageable with a pair of index claws 43a, 43b, as shown in FIG. 4, the protrusion 41a of the index plate 41 gets sandwiched between the index claws 43a, 43b, which then approach each other, and is thus indexed to a predetermined angular position. Namely, the above constitutes a fine indexing device generally indicated by the reference numeral 48, the detail of which will be described hereinbelow. A pair of pilot bars 44, only one being shown, are fixed on the spindle head 21 to be extended tangentially of the index plate 41, and the index claws 43a, 43b are mounted on and slidable along the pilot bars 44. Follower pins 49a, 49b, embedded in the rear ends of the index claws 43a, 43b, are engaged, respectively, at spherical head portions thereof with two closed cam slots 45a, 45b formed on the circumferential surface of a cam drum 45, which is supported on the spindle head 21 to be rotated about its axis parallel with the bars 44. The cam drum 45 is drivingly connected at its one end with an index motor 46 mounted on the spindle head 21 so as to be rotated thereby in one direction, the motor 46 containing a speed reduction mechanism.

Figure 5:
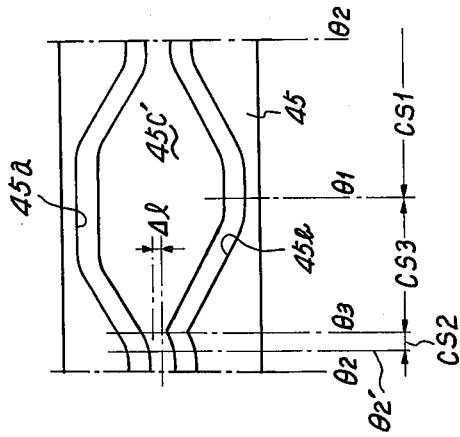
FIG. 5 shows an expansion plan of the cam drum shown in FIG. 4.

As shown expanded in FIG. 5, at an angular position $\theta1$, the cam slots 45a, 45b are respectively formed parallel along the upper and lower verges of the cam drum 45 and, thus, the index claws 43a, 43b, guided thereby, are respectively withdrawn from the rotational locus of the protrusion 41a to the most open condition, as indicated by the phantom line in FIG. 4, so as to permit the rotation of the tool spindle 10. When a limit switch LS1 is activated by a dog 47a, it is detected that the index claws 43a, 43b are at the angular position $\theta1$ of the cam drum 45. A first cam segment CS1 extends from the angular position $\theta1$ to another angular position $\theta2'$, within the extent of which the cam slots 45a, 45b gradually approach each other to sandwich the protrusion 41a between the index claws 43a, 43b, whereby the protrusion 41a, having been positioned within the angular range or extent $2\beta$, is indexed to the three o'clock position, as shown in FIG. 4. Another limit switch LS2 is provided to detect another angular position $\theta2$ of the cam drum 45, when activated by a dog 47b. Furthermore, a second cam segment CS2 is defined between the position $\theta2'$ and another angular position $\theta3$, within the extent of which the cam slots 45a, 45b are inclined upwardly with a parallel relation to each other. Accordingly, within this extent, the index claws 43a, 43b are upwardly moved together with the protrusion 41a sandwiched thereby, which thus rotates the index plate 41 and the spindle 10 a little in a counterclockwise direction, as viewed in FIG. 4. A third cam segment CS3 extends from the position $\theta3$ to the position $\theta1$, between which the cam slots 45a, 45b are gradually separated from each other so as to remove the index claws 43a, 43b from the rotational locus of the protrusion 41a.

Figure 6:
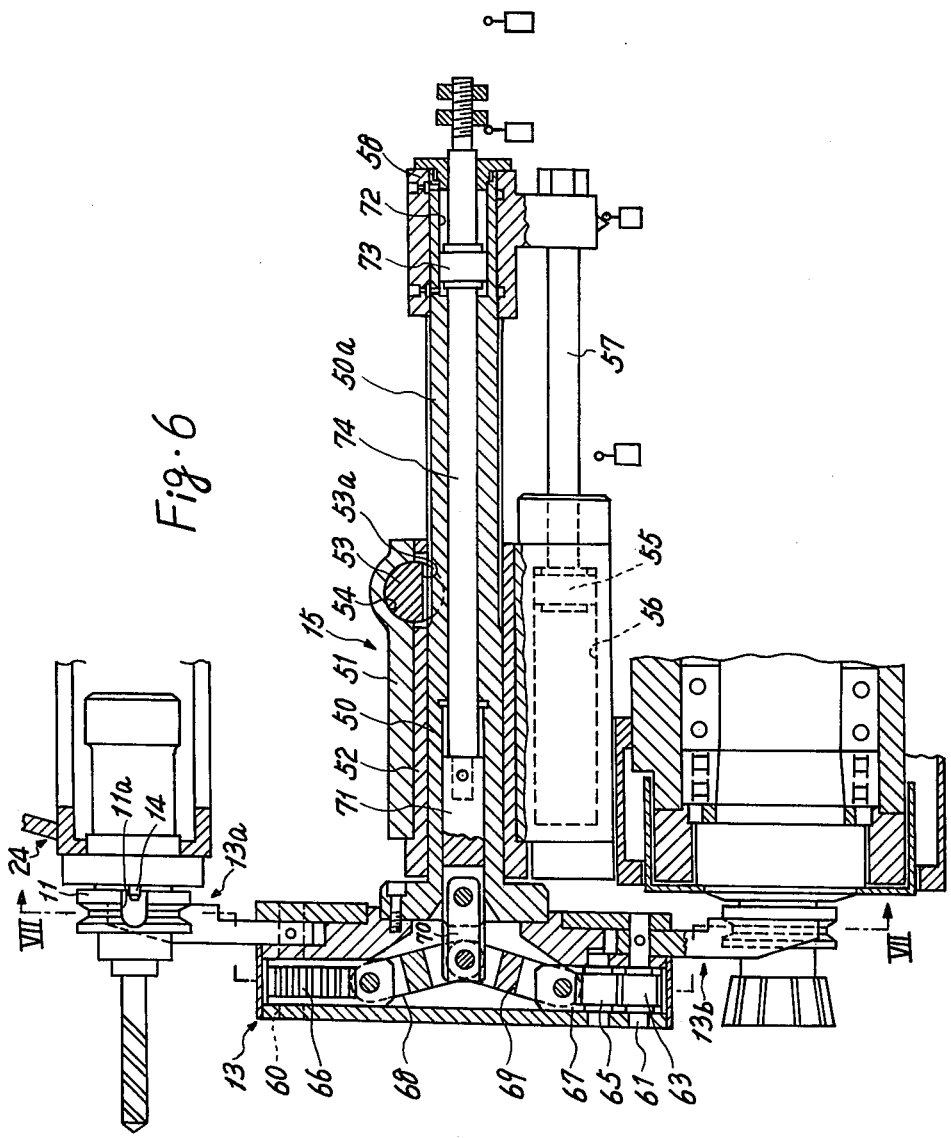
FIG. 6 is a longitudinal sectional view of the apparatus taken along the line VI—VI of FIG. 2, showing particularly one of the storage sockets mounted upon the tool magazine.

An exchange arm 13, as shown in FIG. 6, is fixed on one end of a hollow shaft 50 which is able to both rotate about its own axis and move in a straight axial line. Within a support housing 51 for operably supporting the hollow shaft 50, there are formed cylinders 54 and 56, the former of which slidably contains therein a piston rack 53 movable perpendicularly of the hollow shaft 50, and the latter of which slidably contains a piston 55 movable parallel to the hollow shaft 50. The piston rack 53 is meshed at its rack tooth portion 53a with a spur gear 50a cut upon the outer periphery of the hollow shaft 50 and is allowed to move in its axial direction in such meshed condition, thus causing rotation of the hollow shaft 50. A piston rod 57 of the piston 55 is connected with a hydraulic distributor 58, which, at the rear end of the hollow shaft 50, is so arranged as to be rotatable relatively thereto, that is, to permit rotation of the hollow shaft 50 therewithin, but to move integrally therewith in the axial direction, and thus, the reciprocation movement of the piston 55 can cause the hollow shaft 50 to move forwardly and rearwardly therewith.

Figure 7:
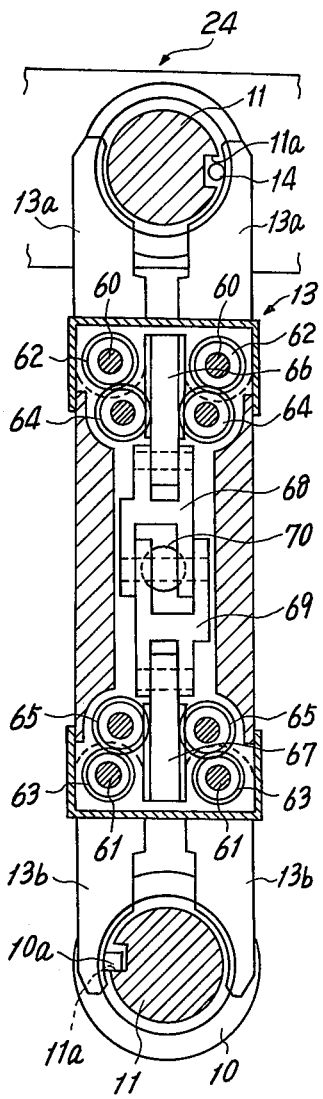
FIG. 7 is a longitudinal sectional view of the apparatus taken along the line VII-VII of FIG. 6.

At both the ends of the exchange arm 13, a pair of grippers 13a, 13b are provided being pivotably supported about pivot pins 60, 61, on which pinions 62, 63 are keyed, which are in turn meshed through idle pinions 64, 65 with rack bars 66, 67 slidable radially of the hollow shaft 50, respectively, as best shown in FIG. 7. The inner ends of the rack bars 66, 67 are pivotably connected, respectively, to one end of links 68, 69, of which the other ends are mutually overlapped and pivotably connected with one end of a floating link 70. The other end of the floating link 70 is pivotably connected to a slider 71 inserted into the hollow shaft 50, and the slider 71 is further connected through a rod 74 to a piston 73 inserted into a gripping cylinder 72 which is formed at the rear end of the hollow shaft 50, within the hydraulic distributor 58. Therefore, when the piston 73 is forwardly moved, pushing the floating link 70 to radially extend the links 68, 69, the rack bars 66, 67 are moved away from each other, so that each pair of grippers 13a, 13b are closed to grip the tools 11. To the contrary, the rearward movement of the piston 73 causes the links 68, 69 to be folded, moving the rack bars 66, 67 toward each other and consequently, the grippers 13a, 13b are opened to release the tools 11.

Figure 2:
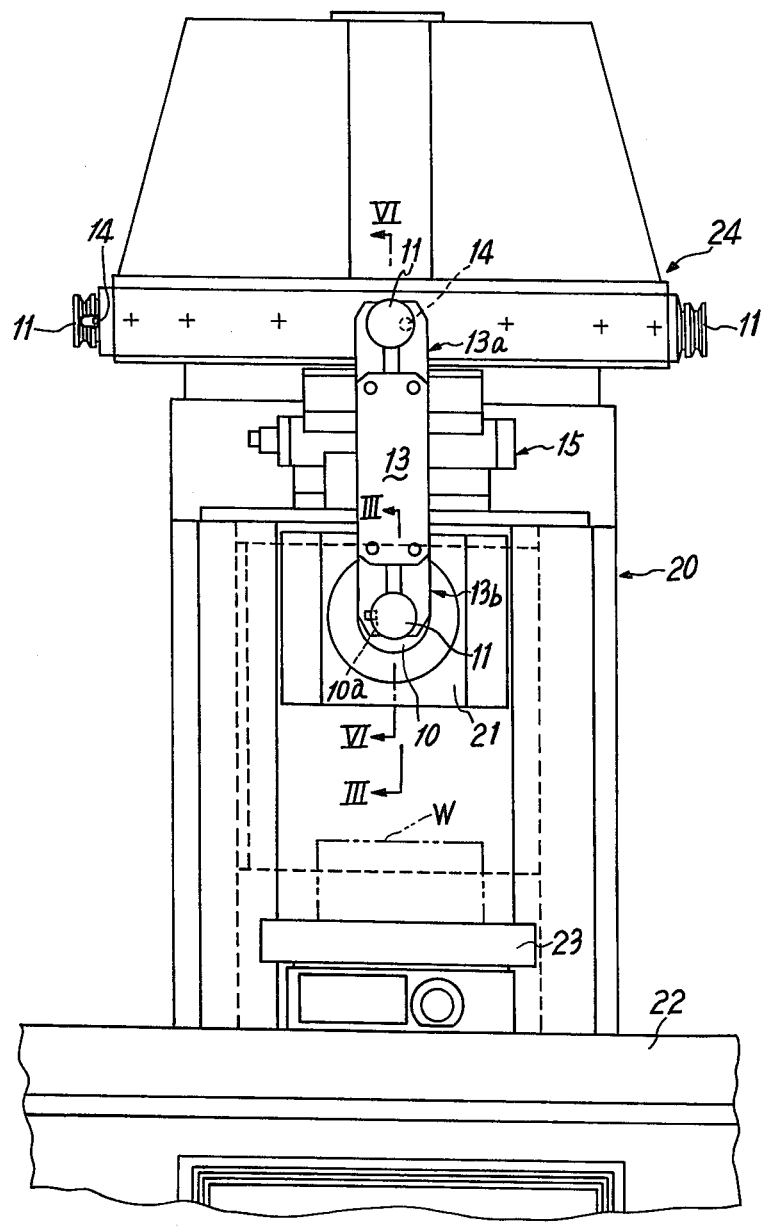
FIG. 2 is a front elevation view of a machine tool constructed in accordance with the present invention.

From each of the tool holding portions of the tool magazine 24, as shown in FIGS. 2 and 7, there protrudes, at the three-o'clock position, a detent pin 14, by which the key-way 11a of the stored tool 11 is prevented from deviating from the three o'clock position more than the angular extent $\pm\alpha$. The aforementioned drive key 10a has substantially the same width as those of the detent pins 14 in its rotational direction.

The operation of the apparatus constructed as above will now be described. When a machining operation is completed, the spindle head 21 is moved upwardly to be positioned at the uppermost travelling end, as shown in FIG. 2, and at the same time, the rotation of the tool spindle 10 is stopped in the following manner. That is, as the motor 37 is first de-energized and then, the brake unit 40 is energized at the time when the approximate switch PRS1 detects that the tool spindle 10 reaches a predetermined angular position, the tool spindle 10 is stopped to place the protrusion 41a of the index plate 41 within the predetermined angular extent, as shown in FIG. 4 (coarse index). Upon the completion of the coarse indexing operation, the index motor 46 is energized until the cam drum 45 is angularly moved from the position $\theta1$ to the position $\theta2$, whereby the index claws 43a, 43b are moved toward each other to be closed. Accordingly, the protrusion 41a is angularly adjusted and positioned at the nine o'clock position accurately corresponding to the detent pin 14 (fine index).

The tool magazine 24 has beforehand been rotationally indexed to present a fresh tool 11, to be next used, to the tool removal station or tool exchange station. As soon as the fine indexing operation is completed, the grippers 13a, 13b of the exchange arm 13 are closed to simultaneously grip a previously used tool 11, received within the tool spindle 10, and the fresh tool 11 indexed to the exchange station. The unclamping cylinder 33 provided at the rear end of the tool spindle 10, is operated to advance the piston 34, pushing the drawing rod 31 against the washer springs 30, so that the used tool 11 is unclamped. Following this, the exchange arm 13 is advanced by the forward movement of the piston 55, and accordingly of the hollow shaft 50, to remove the tools 11 from the tool spindle 10 and the tool holding portion, and subsequently, the piston rack 53 is operated to rotate the hollow shaft 50 and the exchange arm 13 therewith through an angle of 180°. Accordingly, the tool 11 removed from the spindle 10 is aligned with the tool holding portion, and the tool 11 from the same with the spindle 10.

The rearward movement of the piston 55 is then effected to rearwardly move the hollow shaft 50 and to retract the exchange arm 13 therewith and, as a result, the used tool 11 and the fresh tool 11 are inserted respectively into the tool holding portion and the tool spindle 10. In this tool insertion, since the key-way 11a of the fresh tool 11 is held within the angular extent $\pm\alpha$ with the nine o'clock position as the central figure, the tools 11, 11 are inserted respectively without interfering with the drive key 10a of the tool spindle 10 and the detent pin 14 of the tool holding portion. In this event, between the drive key 10a and the key-way 11a of the fresh tool 11, there appears a clearance which reaches 2a at its maximum, but nevertheless positive drive of the tool 11 by the drive key 10a is achieved in the following manner.

That is, when the tool insertion operation is completed, the index motor 46 is energized to rotate the cam drum 45 from the angular position $\theta_2$ to $\theta_1$ and thus, both the index claws 43a, 43b are upwardly moved by an amount $\Delta l$, as indicated in FIG. 5, on the way up to the angular position $\theta_3$. Accordingly, the index plate 41, along with the tool spindle 10, is rotated a little in the counterclockwise direction, so that no clearance is formed between the drive key 10a and one of the key-way walls drivingly urged thereby.

The piston 34 of the unclamping cylinder 33 is thereafter moved in the rearward direction to clamp the fresh tool 11 upon the tool spindle 10 by means of the force of the washer springs 30, and then, the grippers 13a, 13b are opened to release the tools 11, 11. The spindle head 21 is immediately moved toward the machining position and, at the same time, the spindle drive motor 37 is operated to rotate the tool spindle 10 in the counterclockwise direction. Accordingly, another machining operation is initiated in such a condition that the fresh tool 11 is positively and certainly driven by the drive key 10a.

Figure 8:
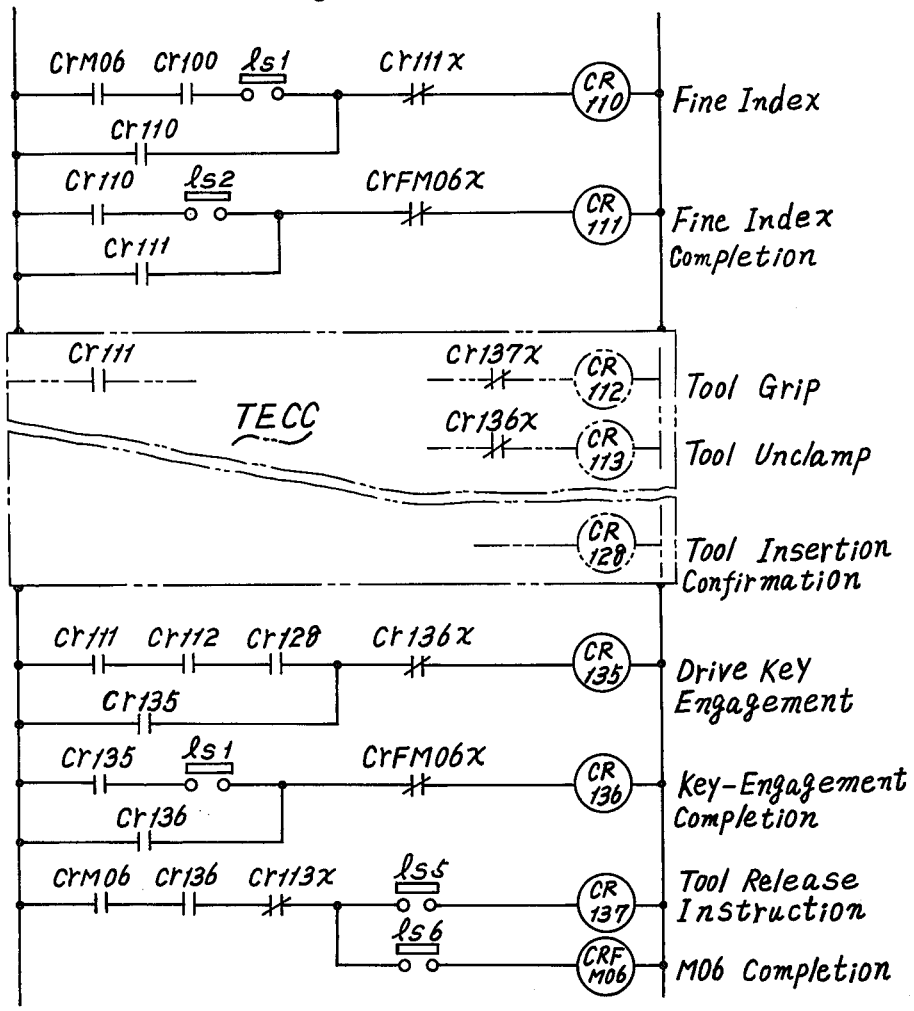
FIG. 8 is a partial ladder diagram of an electric control circuit employed within the apparatus of the present invention.

FIG. 8 shows a portion of an electric control circuit employed to accomplish the above-described operation. When a normally open contact cr100 is closed, upon the completion of the coarse indexing operation, a magnetic relay CR110 is energized and self-held, since a normally open contact crM06 for instructing the tool exchange operation has already been closed. The energization of the relay CR110 operates the index motor 46 to rotate the cam drum 45. When a normally open contact ls2 of the limit switch LS2 is closed, a magnetic relay CR111 is energized and de-energizes the relay CR110 by opening its normally closed contact cr111x. The cam drum 45 is angularly moved from the position $\theta_1$ to the position $\theta_2$, so that the tool spindle 10 is indexed to the predetermined angular position.

The relay CR111, when energized, causes a well-known tool exchange control circuit TECC to operate the exchange arm 13 because its normally open contact cr111 is provided therein as a start instruction. Therefore, the exchange arm 13, as previously mentioned, simultaneously grips the fresh and used tools 11, 11, removes the tools 11, 11 from the tool magazine 24 and the tool spindle 10 after the tool unclamping operation is carried out with the tool spindle 10, rotates through an angle of 180°, and inserts the tools 11, 11 respectively, into the tool magazine 24 and the tool spindle 10. Upon the completion of the tool insertion operation, the tools are still being gripped by the grippers 13a, 13b, whose gripping force is, however, temporarily weakened, and in this connection, a magnetic relay CR135 is then energized through normally open contacts cr111, cr112 and cr128 and a normally closed contact cr136x. The energization of the relay CR135 operates the index motor 46 again so as to further rotate the cam drum 45, whereby positive engagement is brought about between the drive key 10a and the key-way 11a of the fresh tool 11.

When a normally open contact ls1 of the limit switch LS1 is closed, a magnetic relay CR136 is energized to de-energize a magnetic relay CR113 and the relay CR135 by opening its normally closed contacts cr136x. Thus, the fresh tool 11 is clamped upon the tool spindle 11, and the index motor 46 is de-energized so as to cause the index claws 43a, 43b to remain opened and thereby to allow the rotation of the tool spindle 10. When the tool clamping operation is completed, a limit switch LS5 is activated, a normally open contact ls5 of which is therefore closed, to energize a magnetic relay CR137. A normally closed contact cr137x of the relay 137 is thus opened to de-energize the relay CR112, whereby the tools 11, 11 are released from the exchange arm 13. As the completion of the tool release operation results in closing a limit switch contact ls6, a magnetic relay CRFM06 is energized to de-energize the relays CR111 and CR136 by opening its normally closed contacts crFM06x and crFM06x. The energization of the relay CRFM06 is regarded as a complete instruction of the auxiliary function M06, so that, as mentioned above, another machining operation is initiated from this stage.

Figure 10:
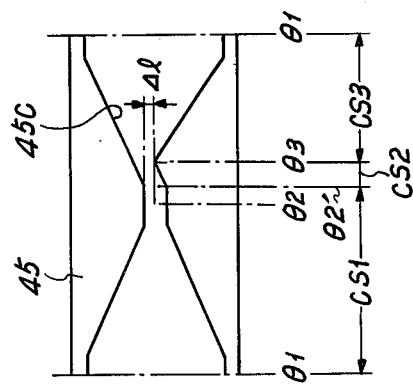
FIG. 10 shows an expansion plan of the cam drum shown in FIG. 9.
Figure 9:
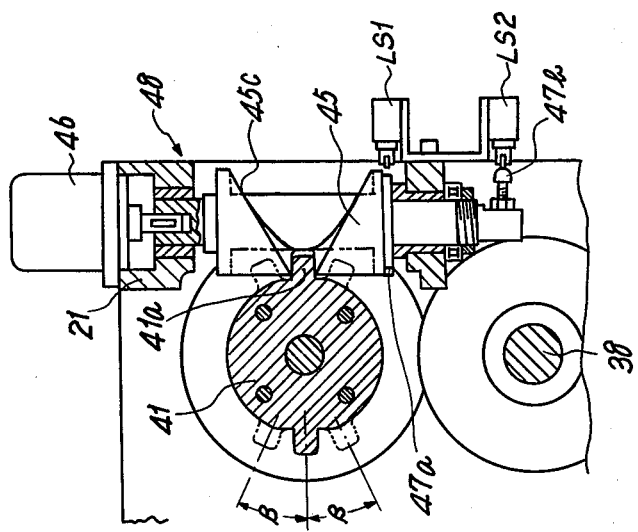
FIG. 9 shows a modification of the fine indexing device shown in FIG. 4.

FIG. 9 shows another stop mechanism modified from that shown in FIG. 4. In this modification, a cam drum 45, disposed with its axis extending tangentially of the tool spindle 10, is provided with a cam way, along which the index protrusion 41a is directly guided. As shown expanded in FIG. 10, the cam way is defined by one cam slot 45c, which effects upon the index protrusion 41a the same indexing movement as the cam slots 45a, 45b, shown in FIG. 4, do through the index claws 43a, 43b. Accordingly, it is noticed that the dimension of the cam slot 45c exactly corresponds to that of a land portion 45c' defined, as shown in FIG. 4, by the cam slots 45a, 45b.

Obviously, other modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a machine tool with an automatic tool exchanger having a tool spindle rotatably supported and capable of receiving a tool at one end thereof, a tool magazine for removably storing a plurality of tools, and exchange means for exchanging tools between said tool spindle and said tool magazine, the improvement comprising:
   a drive key protruding from said one end of said tool spindle and engageable, with a predetermined play in its rotational direction, with a key-way formed on each of said tools;
   a plurality of detents provided on said tool magazine in the same angular relationship with one another and respectively engageable with said key-ways of said tools, each of said detents having almost the same width as that of said drive key in the rotational direction of each tool;
   coarse indexing means for indexing said tool spindle within a predetermined angular extent after a machining operation; and
   fine indexing means comprising
   means provided on said tool spindle for integral rotation therewith,
   a movable cam member operably supported and being drivingly connectable with said means on said tool spindle when the same is indexed within said predetermined angular extent, said cam member being provided with a first cam segment cooperating with said means on said tool spindle for indexing said tool spindle to a predetermined angular position when a first movement of said cam member is effected and a second cam segment cooperating with said means on said tool spindle for rotating said tool spindle a little from said predetermined angular position when a second movement of said cam member is effected, and cam drive means connected to said cam member for generating said first movement of said cam member after said tool spindle is indexed within said angular extent by said coarse indexing means and for generating said second movement of said cam member after a fresh tool is inserted into said tool spindle by said exchange means.

2. A machine tool as set forth in claim 1, wherein said cam member is a cam drum disposed to be rotatable about an axis extending tangentially of said tool spindle, and wherein said cam drive means comprises a drive motor for rotating said cam drum selectively through said first and second movements.

3. A machine tool as set forth in claim 2, wherein said first and second cam segments are formed upon the circumferential surface of said cam drum and communicated with each other.

4. A machine tool as set forth in claim 3, wherein said second cam segment is defined to rotate said tool spindle from said predetermined angular position more than said predetermined play established between said drive key and said key-way of said fresh tool.

5. A machine tool as set forth in claim 4, wherein said means on said tool spindle is an index protrusion protruding radially of said tool spindle, said cam drum being drivingly connectable to said index protrusion so as to adjust the angular position thereof in accordance with said first and second cam segments.

6. A machine tool as set forth in claim 5, wherein said first cam segment is formed to gradually restrain the rotatable angular extent of said index protrusion, so as thereby to index said tool spindle to said predetermined angular position, and wherein said second cam segment is extended helically of said cam drum.

7. A machine tool as set forth in claim 6, wherein said cam drum is further provided with a third cam segment communicating from said second cam segment to said first cam segment and formed to gradually release said index protrusion from the restraint by said cam drum.

8. A machine tool as set forth in claim 4, wherein said cam drum is provided with two closed cam slots on each of which said first and second cam segments are defined, and wherein said fine indexing means further comprises:

guide means extended in parallel relation with the axis of said cam drum, and a pair of indexing claws slidably guided on said guide means and respectively engaged with said closed cam slots so as to be selectively opened and closed, said indexing claws being connectable with said means on said tool spindle to index said tool spindle to said predetermined angular position when closed and permit the rotation of said tool spindle when opened, and said means on said tool spindle being an index protrusion protruding radially of said tool spindle.

9. A machine tool as set forth in claim 8, wherein said first cam segments defined on both of said cam slots gradually approach each other as the angular position of the cam drum advances, so as to move said indexing claws from an open condition to a closed condition, and wherein said second cam segments defined on both of said cam slots are extended herically of said cam drum with a parallel relation, so as to allow said indexing claws to integrally move along said guide means as said indexing claws remain in said closed condition.

10. A machine tool as set forth in claim 9, wherein said cam slots respectively define thereon third cam segments communicating from said second cam segments to said first cam segments and gradually separating from each other so as to release said index protrusion from the restrain by said indexing claws.

11. A machine tool as set forth in claim 9, wherein said fine indexing means further comprises control means for controlling the operation of said drive motor, said control means comprising:

first and second detectors for respectively detecting said open and closed conditions of said indexing claws, a first control circuit for energizing said drive motor when said second detector is activated, after said tool spindle has been indexed within said angular extent by said coarse indexing means, and a second control circuit for energizing said drive motor when said first detector is activated, after said fresh tool has been inserted into said tool spindle by said exchange means.

* * * * *